United States Patent [19]
Gray

[11] Patent Number: 5,283,050
[45] Date of Patent: Feb. 1, 1994

[54] FLUID HANDLING APPARATUS

[75] Inventor: Buddy D. Gray, Giles County, Tenn.

[73] Assignee: Teledyne Industries, Inc., Huntsville, Ala.

[21] Appl. No.: 937,371

[22] Filed: Aug. 31, 1992

[51] Int. Cl.$^5$ .............................................. B01J 08/02
[52] U.S. Cl. .................................... 422/211; 422/218; 422/222; 55/523
[58] Field of Search ................ 422/211, 218; 55/523

[56] References Cited

U.S. PATENT DOCUMENTS

| | | | |
|---|---|---|---|
| 1,685,759 | 9/1928 | Walter | 423/468 |
| 1,959,151 | 5/1934 | Beekley | 422/218 |
| 2,363,738 | 11/1944 | Mather et al. | 422/218 |
| 2,835,560 | 5/1958 | Bason et al. | 422/191 |
| 2,997,374 | 8/1961 | Lavender, Jr. et al. | 422/218 |
| 3,073,684 | 1/1963 | Williams, Sr. | 422/175 |
| 3,167,399 | 1/1965 | Hansen, Jr. | 422/218 |
| 3,567,400 | 3/1971 | Shah | 422/194 |
| 3,736,105 | 5/1973 | Tourtellotte et al. | 422/171 |
| 3,895,919 | 7/1975 | Forster et al. | 422/194 |
| 4,141,830 | 2/1979 | Last | 422/186.3 |
| 4,392,817 | 7/1983 | Berlie et al. | 422/182 |
| 4,707,341 | 11/1987 | Koch et al. | 422/171 |
| 4,780,287 | 12/1988 | Zeff et al. | 422/186.3 |
| 4,829,766 | 5/1989 | Hankel | 55/523 |
| 4,830,833 | 5/1989 | Shaff | 422/172 |
| 4,859,425 | 8/1989 | Zardi | 422/148 |
| 4,954,320 | 9/1990 | Birmingham et al. | 422/186.04 |
| 4,956,152 | 9/1990 | Keough et al. | 422/181 |
| 4,971,771 | 11/1990 | Stahl | 422/218 |
| 4,976,928 | 12/1990 | Föster et al. | 422/218 |
| 4,990,311 | 2/1991 | Hirai et al. | 422/186.3 |
| 5,112,578 | 5/1992 | Murayama et al. | 422/211 |

*Primary Examiner*—Robert J. Warden
*Assistant Examiner*—Hien Tran
*Attorney, Agent, or Firm*—Dickstein, Shapiro & Morin

[57] ABSTRACT

An integrated reactor is capable of mixing, reacting, and/or sparging two or more fluids. The reactor is preferably formed of a porous element and a housing formed of at least two inlets and an outlet. A catalyst may be incorporated into the porous element.

17 Claims, 3 Drawing Sheets

FLUID HANDLING APPARATUS

BACKGROUND OF THE INVENTION

1. Field of the Invention

The present invention relates to a fluid handling apparatus, or reactor, for mixing and/or reacting two or more fluids The present invention also relates to a method of using the apparatus In particular, the present invention relates to an apparatus provided with an internal element by which two or more fluids are mixed, or by which one fluid can be sparged into another, and in which the internal element can be or can support a catalyst for the reaction of the fluids.

2. Description of the Related Art

The prior art contains teachings of different types of reactors or mixing apparatus, but none which achieve the combination of multi-use capability, compact size, and durability demonstrated by the present invention.

Previously, mixing of fluids, catalytic reaction of fluids, and sparging one fluid into another were treated as three separate operations each requiring separate apparatus. Especially in circumstances where weight or space or both were at a premium, e.g., for space flight applications, the weight and space requirements were prohibitive, limiting either the capacity of the various units or even the ability to have each of these capabilities in a space vehicle. Even where a unit was constructed to achieve more than one result there were required a multiplicity of elements or components, each one of which added weight, volume, and cost to the unit.

Reactors having some limited ability to mix reactants in the presence of a catalyst have drawbacks. A primary drawback is that the catalyst is provided in a particulate, granular, bead, or similar non-rigid form. As a result, the reactor requires additional elements designed to hold the catalyst in place. Furthermore, such catalysts are subject to channeling and shifting, which reduce the effectiveness of the catalyst. Especially in an environment such as the launch of a space vehicle, with its attendant high stresses such as wide-frequency vibration, such catalysts are subject to physical degradation due to, e.g., abrasion. Abraded catalyst can be harmful by interfering with the intended flow of fluids through the reactor and in contaminating the fluid flow with the catalyst itself.

The following patents disclose prior art reactors and catalytic vessels intended to separately achieve a desired mixing, catalysis, or sparging: U.S. Pat. Nos. 1,685,759, 2,835,560, 3,895,919, 4,859,425, 4,971,771, 4,830,833, 4,956,152, 4,707,341, and 3,567,400.

U.S. Pat. No. 1,685,759 to Walter discloses a reactor having a permeable membrane in which catalytic particles are embedded and on either side of which gases to be reacted are allowed to flow. Mixing takes place in the membrane. There is no indication that the disclosed membrane can be used in the presence of fluids such as liquids, and no other function, such as sparging, is revealed. There is likewise no indication that this device would withstand rough handling U.S. Pat. No. 2,835,560 to Bason et al., U.S. Pat. No. 3,895,919 to Forster et al., U.S. Pat. No. 4,859,425 to Zardi, and U.S. Pat. No. 4,971,771 to Stahl, are similar in that they all teach use of multiple catalyst beds. Each of these except for Stahl are also specifically concerned with providing a quenching capability for the disclosed reactors. Each of these disclosures contemplates the use of known granular or pelletized catalysts or catalyst supports.

U.S. Pat. No. 4,830,833 to Shaff discloses a reactor, or catalytic converter, for use in the exhaust system of an internal combustion engine. Shaff's reactor has non-fixed catalytic beads which would be subject to settling and tunnelling under vibrational stress. U.S. Pat. No. 4,956,152 to Keouqh et al. discloses another catalytic converter. Keough is not concerned with mixing at all, utilizing only the single mixed flow provided to it.

U.S. Pat. No. 4,707,341 to Koch et al. does disclose a reactor having a fixed substrate, but does not show this as an integral element of the reactor. Koch's substrate is designed to catch and retain solid particles to ensure complete reaction.

U.S. Pat. No. 3,567,400 to Shah teaches a device to permit sparging air into a liquid through a perforated plate, in which the liquid is directed through a series of baffles within a reaction vessel in order to ensure a complete reaction within the vessel. This reactor is limited to its specific capability of sparging, rather than having multiple uses, and does not suggest an integral device suitable for the high-stress environment and other extraordinary requirements inherent in use in space-going apparatus.

SUMMARY OF THE INVENTION

The disadvantages of the prior art mixers and reactors are overcome by the apparatus and method of the present invention which relates to a fluid handling apparatus having a housing and a rigid, porous element fixedly contained in the housing. The housing has at least two inlets by which at least two separate fluids are diffused directly into and through the porous element. The resulting fluid is withdrawn from the housing through an outlet.

A preferred embodiment of the present invention is formed of a single, integral unit capable of intimately and completely mixing two fluids. The desired mixing may be accomplished in the presence of a selected catalyst, which may have a high surface contact area. Preferably, the catalyst is formed so as to be resistant to high physical stresses such as vibrational stress. The single unit may be used for a variety of mixing and reacting tasks, and may be used with liquids, gases, or both, thus providing savings of both space and weight by eliminating the need for separate units or additional components previously needed to carry out all of the desired tasks.

In one aspect of the present invention, an apparatus is provided to effect the simple but complete mixing of two or more fluids. The apparatus generally includes the fluid sources, conduits from the fluid sources to a reacting or mixing vessel having appropriate inlets, the mixing vessel itself, and at least one outlet The mixing vessel, or reactor, has an outer housing or shell within which is located a rigid porous element such as a microporous sintered substance. The fixed porous element, which may be made of a sintered material and which may be fixedly connected to the housing, is shaped as desired to provide chambers and conduits within the housing to control the flow of fluids to, through, and from the housing.

In another aspect of the invention, the rigid porous element and the outer housing are shaped to provide inlet chambers for the fluids such that the incoming fluids flow to the element at discrete locations remote from the outlet conduit, or from a central chamber. This forces the fluids to flow into and through the fixed element before coming into contact with each other The flow of the fluids from the inlets and/or inlet chambers through the fixed element results in complete and intimate mixing of the fluids before they reach the outlet chamber. In this respect, the porous fixed element eliminates the need for the mixing baffles found in prior art apparatus and also eliminates the need for any physical mixing apparatus such as stirrers. The pore size of the fixed element may be pre-selected to provide the degree of mixing necessary For sparging applications in which one of the fluids is a gas and another is a liquid, a very fine pore size will result in complete mixing with a high contact area between the liquid and the gas.

In another aspect of the present invention, the fixed element may be constructed of or coated with a desired catalyst. The fixed element serves as a rigid, stress-resistant, substrate for the catalyst, and furthermore ensures a very high surface contact area between the mixing fluids and the catalyst. The fixed element may be coated with the catalyst throughout. Alternatively, the fixed element may be coated only in a specific region. In the latter case, the catalyst may be advantageously located in a region through which the fluids flow after they have been completely mixed together.

In another aspect of the present invention, the housing and the fixed porous element may be arranged such that one of the incoming fluids flows directly into a central chamber within the fixed element, while a second fluid flows into and through the fixed element at a region remote from the central chamber. In this arrangement, the second fluid flows in finely diffused form into the central chamber, achieving a high surface contact area with the fluid within the central chamber. If desired, the region of the fixed element immediately surrounding the central chamber may be coated with a catalyst and the flow of the fluids regulated such that the first fluid diffuses a short way into the fixed element around the central chamber. A reaction between the two fluids can then take place in intimate contact with the selected catalyst while maintaining a relatively high volume rate of flow of the first fluid into, through, and out of the apparatus.

The advantages of the apparatus of the present invention are several. First, the apparatus is capable of being used for simple mixing, for reacting by mixing two reactants with or without a catalyst present, and for sparging one fluid into another. The invention may be used with either liquids or gases. By accomplishing these different functions with a single integral unit it is possible to eliminate the need for a plurality of different task performing units.

Another advantage is that, because of the porous nature of the fixed element, the mixing which is accomplished within the element is complete. This is particularly important where the fluids to be mixed are of different phases, such as liquid and gas. Mixing of different phases by existing apparatus is relatively inefficient, and the problem is compounded in low or zero gravity environments such as space. Incomplete mixing, or mixing with a relatively low surface area contact between fluids, requires a higher amount of one fluid or the other to achieve the desired amounts or concentrations of fluids in the final mixture. Incomplete mixing also results in a lower than optimum reaction rate. Complete and intimate mixing avoids fluid wastage and reduces the amount of fluid that must be provided to achieve the desired concentration. This is highly advantageous where the supply of one or the other fluid is subject to space, weight or cost limitations.

A further advantage of the apparatus of the present invention is the rigid nature of the fixed porous element. Providing the element in a rigid form makes it possible to reduce the number of required components by eliminating the need for support structures, mixing baffles, stirrers, and the like. The shape of the element within the housing may itself be sufficient to provide the desired inlet, reaction and outlet chambers, and/or any conduits desired to further direct the flow of fluids within the housing. Moreover, the rigid nature of the element makes it highly resistant to stresses. This is particularly advantageous when the element is coated with, or made from, a desired catalyst. The catalyst will be highly resistant to abrasion or other consequences of stress, eliminating the channeling and degradation to which particulate or granular catalyst beds are subject.

Without limitation, it is contemplated that the present invention may be advantageously used for a variety of processes required on board manned and unmanned space vehicles. where the relatively compact nature of the multiuse apparatus will save both volume and weight, both of which are at a high premium for space vehicles. Furthermore, the high efficacy of the mixing and catalytic capabilities of the present invention will reduce the amount of reactant fluids required to be carried in the space vehicle, and the stress resistant nature of the apparatus makes it highly suitable for the high stress environment of lift-off and reentry. These same advantages will also make the apparatus useful in certain Earth environments.

An object of the present invention is to overcome the incomplete mixing, and hence wastage, of fluids inherent in prior apparatus.

Another object of the present invention is to provide a single apparatus capable of achieving mixing, catalysis, reaction, and/or sparging, thereby eliminating the existing need for different units or components to achieve the various functions.

A further object of the present invention is to provide a mixing and/or reacting apparatus with a fixed element resistant to environmental stresses A further object of the present invention is to provide a fixed element for mixing wherein a catalyst is part of or fixedly coated onto the fixed element to prevent environmentally induced degradation of the catalyst A further object of the present invention is to provide an apparatus capable of intimately mixing fluids of differing phases even in an environment such as space where such mixing is particularly problematic.

Other objects and advantages of the present invention will become apparent from the following description and drawings which illustrate preferred embodiments of the present invention.

DETAILED DESCRIPTION OF PREFERRED EMBODIMENTS

Figure 1:
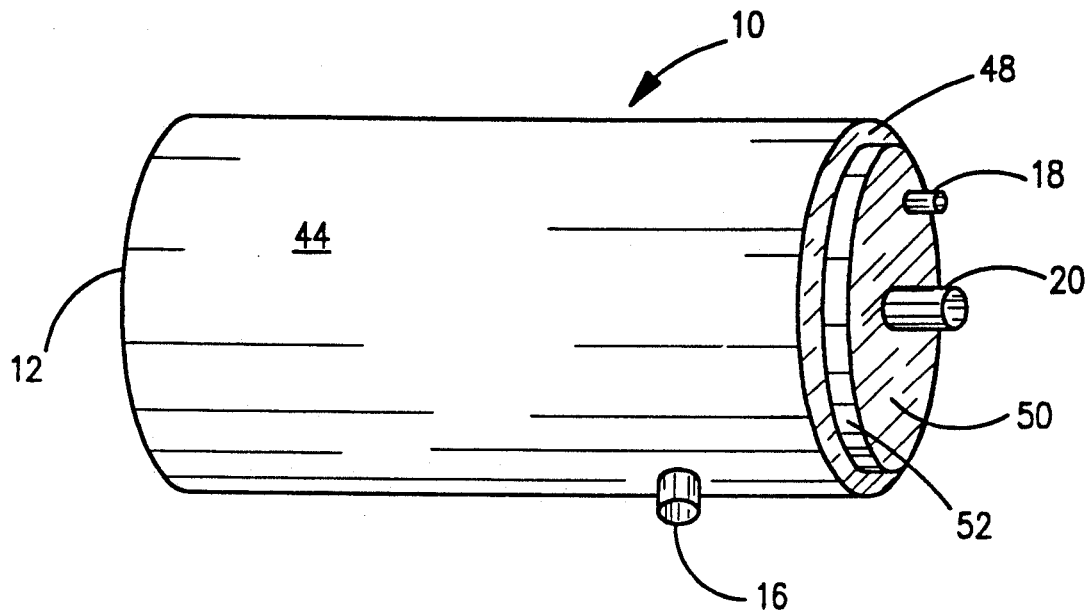
FIG. 1 is a perspective view of a fluid mixing apparatus according to a preferred embodiment of the present invention.
Figure 3:
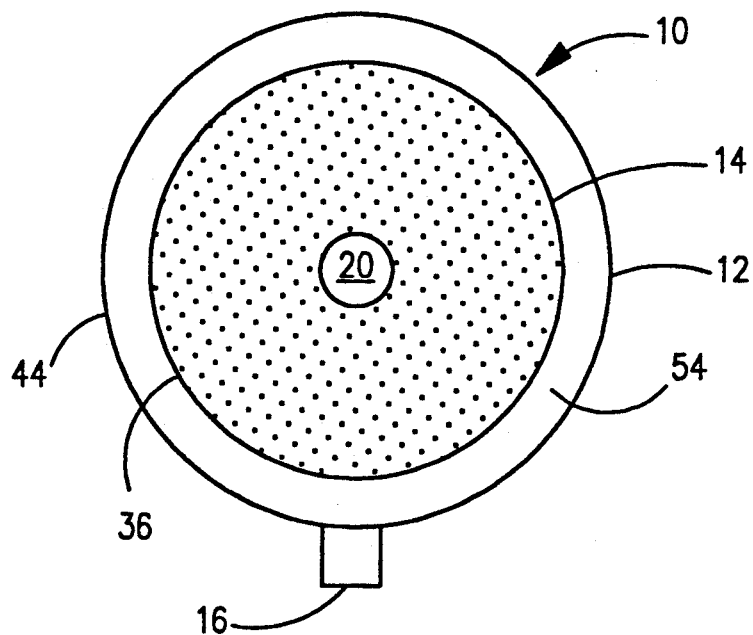
FIG. 3 is a cross-sectional view taken along the line 3—3 of FIG. 2.
Figure 2:
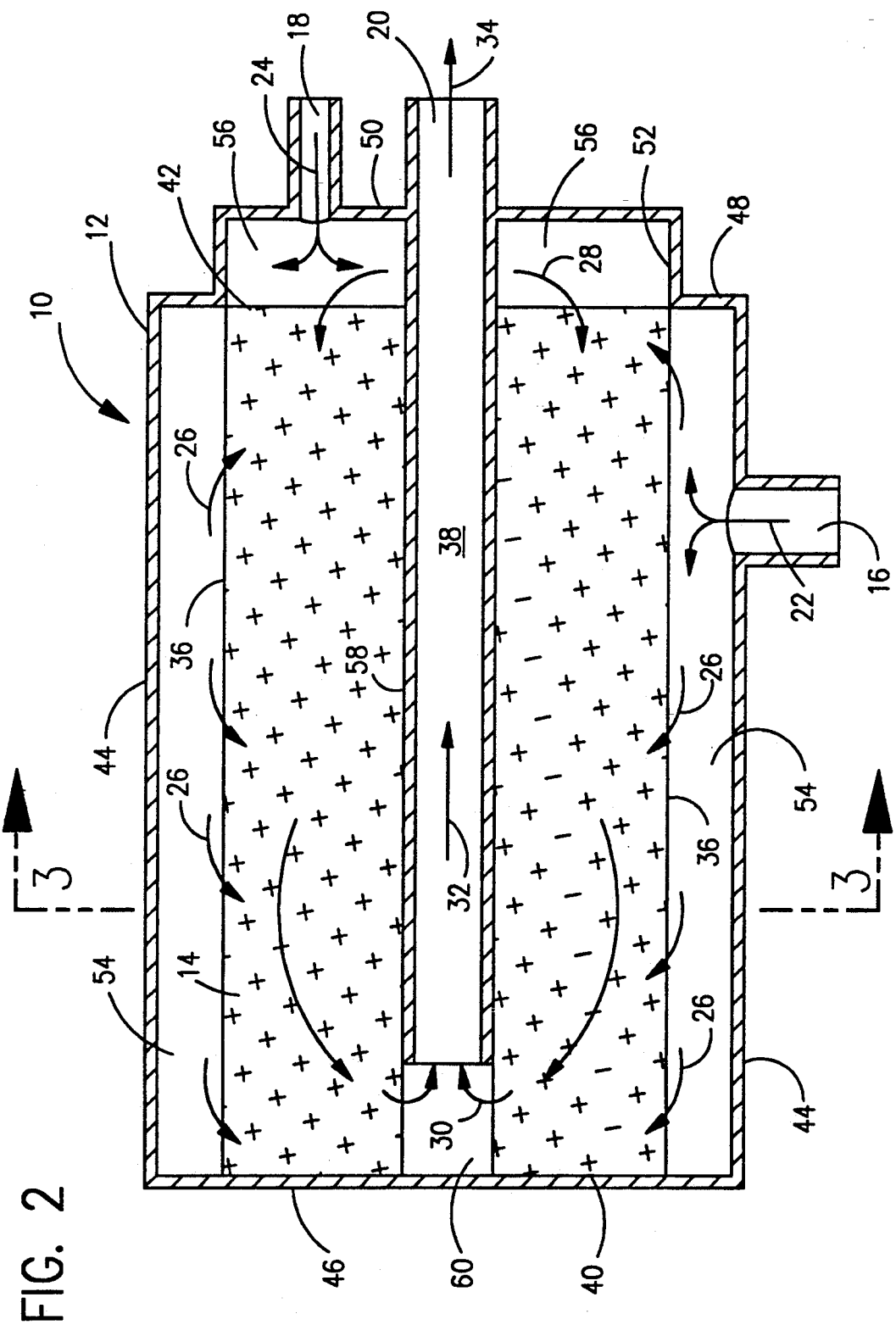
FIG. 2 is an enlarged, axial cross-sectional view of the apparatus of FIG. 1, taken through a plane intersecting the apparatus's inlets and outlet.

Referring now to the drawings, in which like reference numerals indicate like elements, there is shown in FIG. 1 an apparatus 10 constructed in accordance with the present invention. The apparatus 10 is formed of a housing 12, a fixed porous element 14 (FIG. 2), first and second inlets 16, 18 and an outlet 20. In operation, first and second fluids flow into the housing 12 through the first and second outlets 16, 18, respectively, in the directions respectively indicated by arrows 22 and 24. The first and second fluids then diffuse or flow into the porous element 14 in the directions indicated by arrows 26 and 28. A resultant third fluid (a mixture of or a reaction product of the first and second fluids) is thereby formed within the element 14. The third fluid exits the housing 12 through the outlet 20 along the path designated by arrows 30, 32 and 34.

In the illustrated embodiment, the fixed porous element 14 has a cylindrical outer surface 36, a cylindrical inner channel 38, and first and second annular end surfaces 40, 42. The housing 12 has a cylindrical exterior shell 44, a first circular end wall 46, a second annular end wall 48, and an annular end plate 50 connected to the end wall 48 by a cylindrical member 52. The dimensions of the housing 12 and the element 14 are such that an elongated annular (or circumferential) chamber or plenum 54 is defined by the outer surface 36 of the element 14 and the end walls 46, 48 and cylindrical shell 44 of the housing 12. Further, a disk-shaped chamber or plenum 56 is defined by the element's second end surface 42 and by the housing's end plate 50 and cylindrical member 52. In the illustrated embodiment, there is advantageously no fluid communication between the two chambers 54, 56 except through the porous element 14.

The element 14 is preferably formed in one piece of a rigid, stress-resistant, porous sintered material, and preferably includes a catalyst for reacting the first and/or second fluids. The element 14 may be formed of a microporous sintered material to ensure a large surface area for contact among the first and second fluids and the catalyst and to ensure that the reacting fluids are intimately mixed. The catalyst may form a coating within the micropores of the element 14. Without limitation, the fixed porous element 14 may be manufactured by known techniques used for the production of commercially available ceramic cross-flow ultrafilters. Techniques for coating the pores of a porous element like element 14 with a desired catalyst are also known. The pore size for the element 14 may be selected as a function of the mixing or reacting to be accomplished, and also as a function of the composition of the fluids to be mixed and/or reacted.

In the illustrated embodiment, the outlet 20 is formed at the end of an impermeable pipe or conduit 58 which extends along the channel 38, and which prevents fluid from flowing directly into the channel 38 along the entire length of the element 14. The portion of the channel 38 which is not covered by the pipe 58 forms an egress region 60 into which mixed and/or at least partially reacted fluid reactants can flow into the channel 38 in the direction indicated by arrows 30 and then out through the outlet 20 in the direction indicated by arrows 32 and 34.

In operation, the first fluid (which may be a primary reactant fluid) flows from a first source (not illustrated) through the inlet 16 and into the peripheral chamber 54. The fluid should fill the entirety of the chamber 54 in order to most completely distribute the fluid for subsequent mixing or reacting. Since the chamber 54 extends along the entire length of the element 14, the entire cylindrical surface 36 of the element 14 is available for diffusion of the fluid into the element 14. The pressure of the first fluid flowing into the inlet 16 may be regulated to achieve the desired flow rate characteristics into and through the rigid substrate element 14.

The second fluid (which may be a secondary reactant fluid) flows from a second source (not illustrated) into the chamber 56 through the inlet 18. Again, it is preferable that the fluid fill the chamber 56 entirely. This ensures the highest surface contact area between the first and second fluids and among the two fluids and any derived catalyst supported on the catalytic bed element 14.

The mixing of the two fluids is enhanced by the fact that the first fluid will tend to diffuse from the inlet chamber 54 into and through the fixed element 14 in a radially inward direction, that is, directly toward the cylindrical channel 38 throughout the length of the element 14. Simultaneously, the second fluid diffuses into and through the element 14 in an axial direction parallel to the pipe 58. Adjusting the fluid pressure of the two fluids allows fine control of the flow pattern and mixing of the fluids throughout the element 14, and also allows fine control of the retention time of the mixed fluids within the element 14.

The degree of mixing of the two fluids and the time of retention within the element 14 may also be controlled, at least in one determined manner, by the degree to which the impermeable conduit 58 extends into the channel 38. For example, the conduit 58 may be positioned such that it covers almost the entire inner surface of the channel 38 so as to force the fluid to flow almost the entire axial length of the element 14, to provide a relatively long time for mixing and/or reacting. A relatively short extension of the conduit 58 into the channel 38 may be provided when it is desired to have the fluid follow a shorter path through the element 14, with a relatively shorter retention time.

The foregoing methods of controlling the flow rate, the time and degree of mixing, and the retention time within the element 14 are also examples of ways to control the stoichiometric ratio of the fluids or the components of the fluids. Other methods, such as varying the outflow rate through the outlet 20, may also be used.

Figure 4:
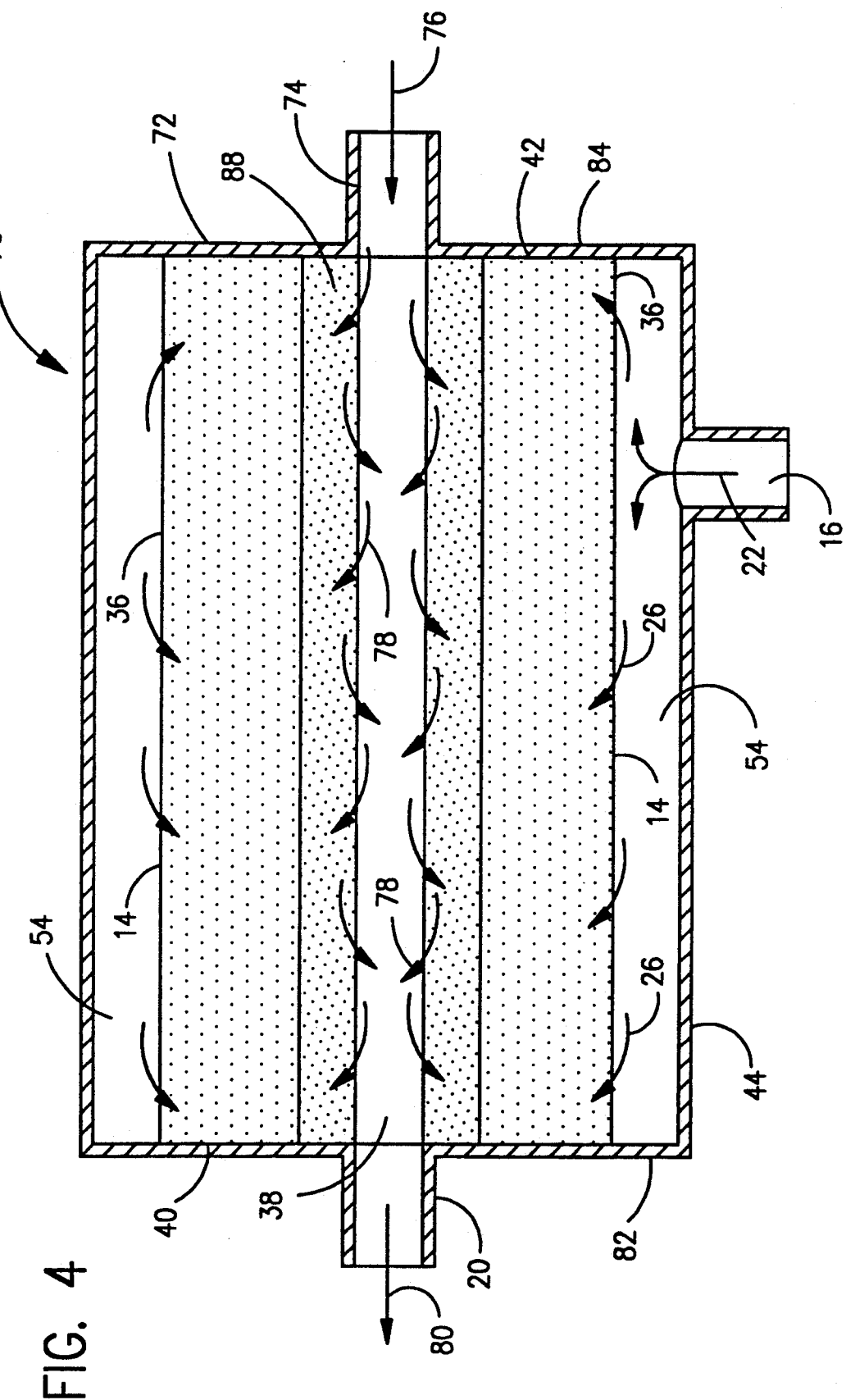
FIG. 4 is an axial cross-sectional view of a fluid mixing apparatus according to another preferred embodiment of the present invention.

Refer now to FIG. 4, which shows another apparatus 70 constructed in accordance with the present invention. The apparatus 70 is formed of a housing 72, a fixed porous element 14, first and second inlets 16, 74 and an outlet 20. In operation, first and second fluids flow into the housing 72 through the first and second inlets 16, 74, respectively, in the directions respectively indicated by arrows 22 and 76. The first and second fluids then diffuse or flow into the porous element 14 in the directions indicated by arrows 26 and 78. A third fluid (a mixture of or a reaction product of the first and second fluids) is thereby formed within the element 14. The third fluid exits the housing 72 through the outlet 20 along the path designated by arrow 80.

In the illustrated embodiment, the fixed porous element 14 has a cylindrical outer surface 36, a cylindrical inner channel 38, and first and second end surfaces 40, 42. The housing 72 has a cylindrical exterior shell 44 and first and second annular end walls 82, 84. The dimensions of the housing 72 and the element 14 are such that an elongated annular (or circumferential) chamber or plenum 54 is defined by the outer surface 36 of the element 14 and the end walls 82, 84 and cylindrical shell 44 of the housing 72. In the illustrated embodiment, there is advantageously no fluid communication between the chamber 54 and the second inlet 74 except through the porous element 14.

In operation, the first fluid (which may be a primary reactant fluid) flows from a first source (not illustrated) through the inlet 16 and into the peripheral chamber 54. The fluid should fill the entirety of the chamber 54 in order to most completely distribute the fluid for subsequent mixing or reacting. Since the chamber 54 extends along the entire length of the element 14, the entire cylindrical surface 36 of the element 14 is available for diffusion of the fluid into the element 14. The pressure of the first fluid flowing into the inlet 16 may be regulated to achieve the desired flow rate characteristics into and through the rigid substrate element 14.

The second fluid (which may be a secondary reactant fluid) flows from a second source (not illustrated) into the channel 38 through the inlet 74. Because the inner surface of the channel 38 is permeable, the fluid can diffuse radially outwardly from the channel 38 and into the element 14. Adjusting the fluid pressure of the incoming fluids will determine the degree to which such diffusion will occur into and throughout the element 14. The desired mixing and catalysis preferably occurs within the pores of the element 14, and the products of the mixing and catalysis flow out of the apparatus along flow line 80.

In either of the illustrated embodiments, a catalyst may be coated onto only an inner portion 88 of the sintered element 14 in the immediate vicinity of the inner channel 38.

The present invention is capable of use under a wide variety of mixing and reacting conditions. The strength and simplicity of the apparatus, and the intimate mixing achieved, allow high pressure and high flow rates. The rigid element 14 may be made resistant to a wide range of pH levels, and is also capable of operation within a wide range of temperatures. These qualities make the apparatus uniquely suitable for use in space flight, where several different reactions or mixings among widely diffused fluids may be needed. The environment in a space vehicle can be a generally hostile one in terms of temperature variations and vibrational and other types of stress. The apparatus of the present invention is capable of withstanding these conditions while solving the deficiencies of prior reaction apparatus.

The present invention is not limited to the preferred embodiments shown and described herein. For example, the housings 12 and 72 may take a variety of configurations appropriate to the space available and the demands of other systems. However, a cylindrical configuration for the housings 12 and 72 is believed to provide the greatest interior volume and reactant/catalyst surface area within the space available for placement of the apparatus.

Moreover, the element 14 may be formed of two or more concentric cylinders and/or two or more axially sectioned pieces. The present invention is not necessarily limited to the one piece porous element described above, although the one piece construction is presently believed to be the most advantageous construction.

The above description is intended to be illustrative of preferred embodiments which can achieve the objects, features, and advantages of the present invention. It is not intended that the present invention be limited thereto. Any modifications coming within the spirit and scope of the following claims are to be considered part of the present invention.

What is claimed as new and desired to be protected by Letters Patent of the United States is:

1. A fluid handling apparatus, comprising:
a housing;
a rigid porous element fixedly contained within said housing;
inlets for introducing a plurality of fluids into said housing, said inlets being arranged such that the fluids diffuse into said porous element, with a resultant fluid being formed substantially within said porous element; and
an outlet for withdrawing the resultant fluid from said housing; and
wherein said inlets include at least first and second inlets, said first inlet being arranged to introduce a first fluid into said housing, and said second inlet being arranged to introduce a second fluid into said housing; and
wherein said porous element has a one-piece, unitary construction with a cylindrical wall, said cylindrical wall having a cylindrical inner surface and a cylindrical outer surface, said inner surface defining a cylindrical inner channel for conducting the resultant fluid to said outlet, and wherein a radial thickness of said cylindrical wall between said inner and outer surfaces is substantially greater than a diameter of said inner channel.

2. The apparatus of claim 1, wherein said porous element is formed of sintered material.

3. A fluid handling apparatus, comprising:
a housing;
a rigid porous element fixedly contained within said housing, said rigid porous element defining an inner channel;
at least first and second inlets for introducing a plurality of fluids into said housing, said inlets being arranged such that the fluids diffuse into said porous element, with a resultant fluid being formed substantially within said porous element; and
an outlet for withdrawing the resultant fluid from said inner channel; and
wherein said first inlet is arranged to introduce a first fluid into said housing, said second inlet being arranged to introduce a second fluid into said housing; and
wherein said porous element and said housing define a peripheral chamber, said chamber being in fluid communication with said first inlet; and
wherein said porous element and said housing define a second chamber, said second chamber being in fluid communication with said second inlet, and wherein said second chamber is separated from said peripheral chamber by said porous element, and wherein said second chamber is separated from said inner channel by said porous element.

4. The apparatus of claim 3, wherein said inner channel is connected to said outlet.

5. The apparatus of claim 4, wherein said porous element has a one-piece, unitary construction with a cylindrical wall, said cylindrical wall having a cylindrical inner surface and a cylindrical outer surface, and wherein a radial thickness of said cylindrical wall between said inner and outer surfaces is substantially greater than a diameter of said inner channel.

6. A fluid handling apparatus, comprising:
a housing;
a rigid porous element fixedly contained within said housing;
inlets for introducing a plurality of fluids into said housing, said inlets being arranged such that the fluids diffuse into said porous element, with a resultant fluid being formed substantially within said porous element; and
an outlet for withdrawing the resultant fluid from said housing; and
wherein said inlets include at least first and second inlets, said first inlet being arranged to introduce a first fluid into said housing, and said second inlet being arranged to introduce a second fluid into said housing; and
wherein said porous element and said housing define a peripheral chamber, said peripheral chamber being in fluid communication with said first inlet; and
wherein said porous element and said housing define a second chamber, said second chamber being in fluid communication with said second inlet, and wherein said second chamber is separated from said peripheral chamber by said porous element; and
wherein said porous element includes an inner channel connected to said outlet, and wherein said inner channel has a permeable inlet surface portion and an elongated impermeable surface portion for causing the resultant fluid to flow toward the permeable inlet surface portion, and wherein said porous element has first and second ends, said permeable inlet surface portion being located adjacent to said second end of said porous element, said impermeable surface portion being located adjacent to said permeable inlet surface portion.

7. The apparatus of claim 6, wherein said impermeable surface portion is defined by an impermeable conduit, said impermeable conduit being located within said porous element.

8. A method of handling fluid, said method comprising the steps of:
(A) providing a housing, a fixed porous element contained within said housing, inlets, and an outlet;
(B) introducing first and second fluids into said housing through said inlets;
(C) diffusing said fluids into said porous element, and thereby forming a third fluid substantially within said porous element; and
(D) withdrawing said third fluid from said housing through said outlet; and
wherein said first fluid is a liquid.

9. The method of claim 8, wherein said second fluid is a gas.

10. The method of claim 8, wherein said third fluid is a mixture of said first and second fluids.

11. The method of claim 8, wherein said third fluid is a reaction product formed by reacting said first and second fluids.

12. The method of claim 8, wherein said porous element is formed of sintered material.

13. The method of claim 16, wherein at least a portion of said porous element is coated with a catalytic material, and wherein said third fluid is formed by catalytically reacting said first and second fluids within said porous element.

14. The method of claim 8, wherein said porous element and said housing define a peripheral chamber, said chamber being in fluid communication with a first one of said inlets.

15. The method of claim 14, wherein said porous element and said housing define a second chamber, said second chamber being in fluid communication with a second one of said inlets, and wherein said second chamber is separated from said peripheral chamber by said porous element, and wherein said outlet is connected to an inner channel defined by said porous element, said second chamber being separated from said inner channel by said porous element.

16. The method of claim 14, wherein said porous element defines an inner channel, said channel being connected to said outlet.

17. The method of claim 14, wherein said porous element has a one-piece, unitary construction with a cylindrical wall, said cylindrical wall having a cylindrical inner surface and a cylindrical outer surface, said inner surface defining a cylindrical inner channel for conducting the third fluid to said outlet, and wherein a thickness of said cylindrical wall between said inner and outer surfaces is substantially greater than a diameter of said inner channel.

* * * * *